Nov. 1, 1938.   R. C. FERGASON   2,134,867
CORN HARVESTER GATHERING MECHANISM
Filed Feb. 26, 1937   2 Sheets-Sheet 1
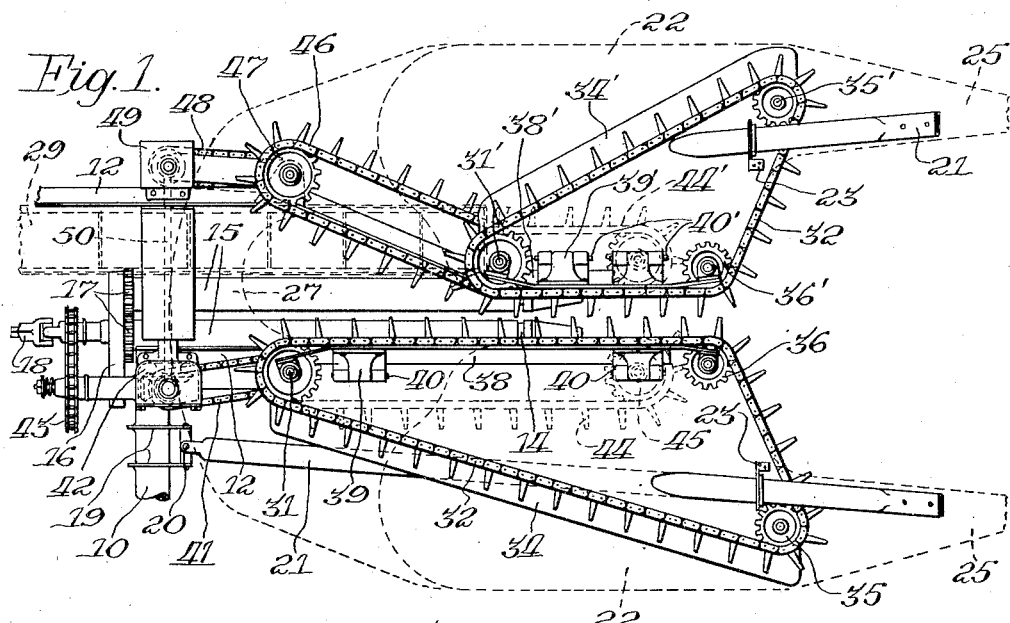
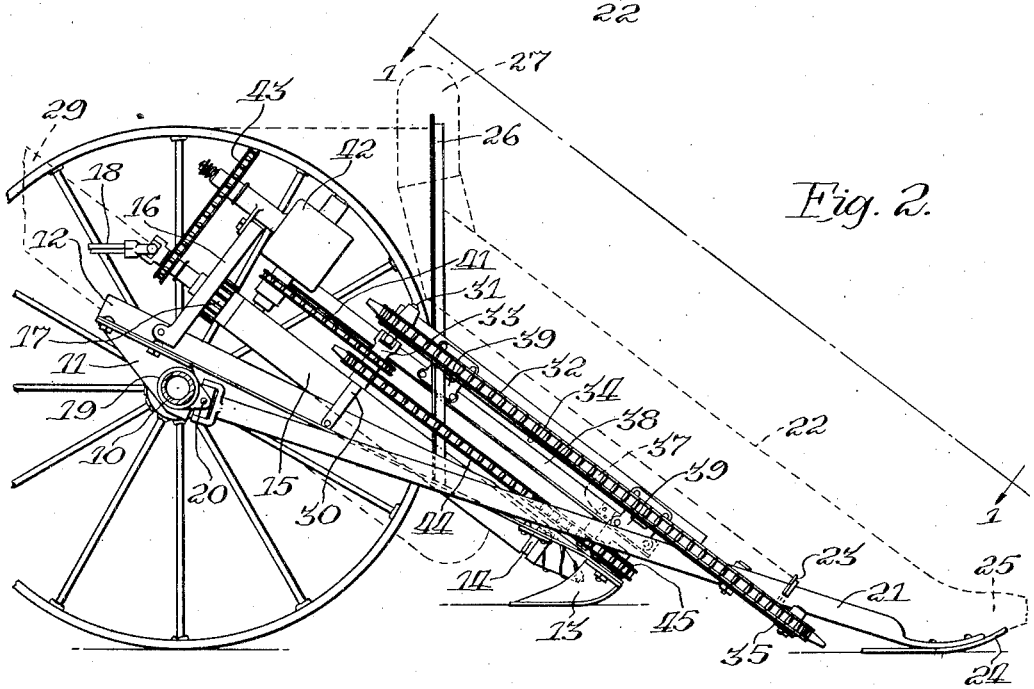
Inventor
Rector C. Fergason
By V. F. Lassagne
Atty.

Patented Nov. 1, 1938

2,134,867

UNITED STATES PATENT OFFICE 2,134,867

CORN HARVESTER GATHERING MECHANISM

Rector C. Fergason, Moline, Ill., assignor to International Harvester Company, a corporation of New Jersey Application February 26, 1937, Serial No. 127,849

16 Claims. (Cl. 56—119)

The invention relates to gathering mechanism as used in corn harvesting machinery, such for example as corn pickers.

Corn pickers embody a pair of spaced, upwardly inclined gathering units providing a throat therebetween for the entry of the standing stalks, so that a pair of snapping rollers included in the mechanism may snap and remove the ears from the stalks. Associated with each gathering unit are gathering chains to assist in holding the stalks while the rollers act thereon. Each unit includes a gathering point or runner shoe riding on the ground to guide the units in relation to the rows of standing stalks. This gathering mechanism is not sufficiently flexible to act on stalks which may be lying or bent over on the ground; in fact, where the stalks grow on the apex of ridged rows and the stalks lie bent over and down in the hollows between the ridges, the gathering mechanism must completely miss such stalks and result in ineffective operation, since many of the ears will be entirely missed. This is so because the gathering chains heretofore have had a fixed position in relation to the points on the gathering units, and also because they do not spread out laterally far enough to be able to gather such down stalks.

It is desirable, therefore, to improve these corn harvesting machines by providing a more flexible gather chain structure which will be more aggressive than gatherers heretofore used, by making said gatherers capable of raking the sides of ridges to pick up the stalks and any loose ears lying thereon.

The main object of the invention is to provide an improved gathering mechanism for corn pickers.

Another object is to provide a flexible gathering mechanism of the kind stated, which may float and thereby be enabled to gather stalks and ears lying on the sides of stalk ridges.

Another object is to provide a snapping unit in which the gatherer chain and gatherer point may float as a unit.

Another object is to hinge the gatherer chains for floating movement about an axis parallel to the axis of the snapping rolls.

Still another object of the invention is to provide means whereby the snapping unit may adjust itself to either level or ridged ground, while keeping the snapping roll points the same distance from the base line of the stalks.

Other important objects will become apparent to those skilled in this art as the disclosure is more fully made.

These objects are briefly accomplished by the illustrative example herein shown and described for purposes of the disclosure, in which example the gatherer chains and gatherer point are carried for flotable or hinging movement parallel to the axes of the snapping rolls, thereby allowing the snapping unit to adjust itself to either ridged or level ground while keeping the snapping roll points the same distance from the stalk base. This structure is shown in detail in the accompanying sheets of drawings, wherein:

Figure 1 is a general plan view of the improved gathering mechanism associated with a corn picker and taken along the line 1—1 of Figure 2, with the usual shield structure indicated in dotted lines to expose the mechanism therebelow;

Figure 2 is a general side elevational view of the structure shown in Figure 1, with the inner wheel removed, and with the usual shield structure also being shown in dotted lines to expose the mechanism therebehind;

Figure 3:
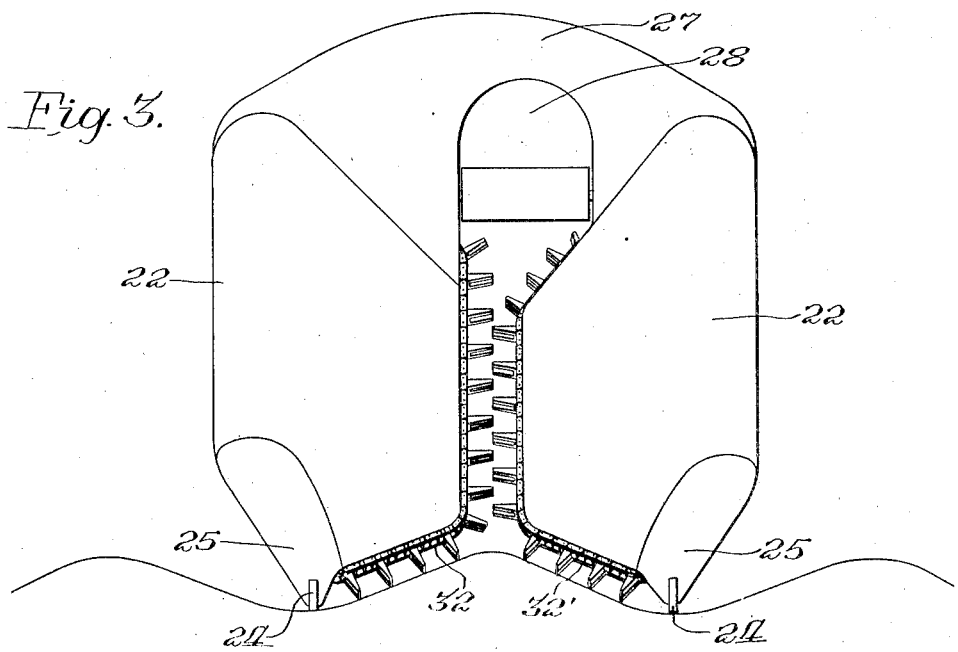
Figure 4:
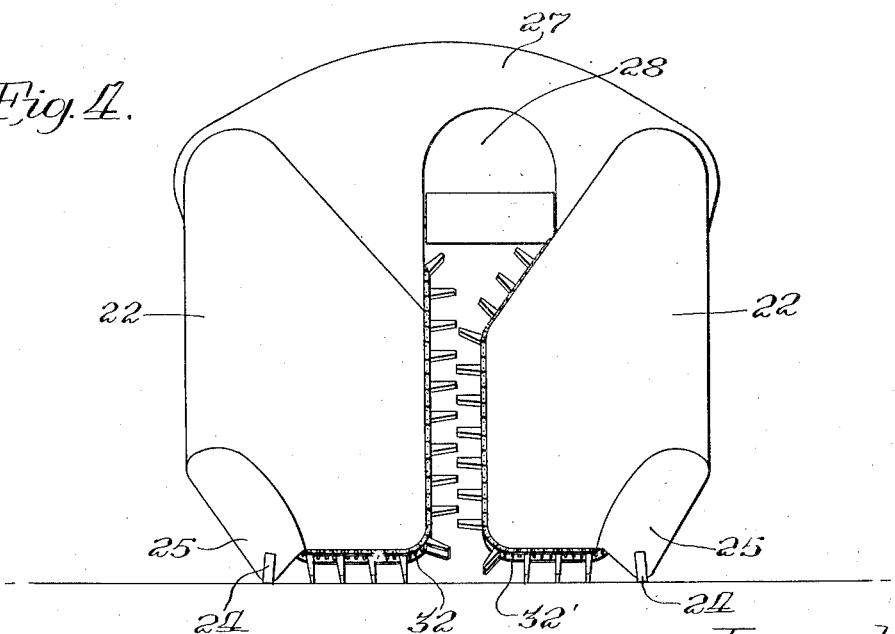

Figure 3 is a front view of the gathering mechanism showing the shield structure, with the gathering chains operating to rake the slopes of a stalk ridge with the points of the gathering unit dropped to the bottom of the respective opposite dwells delineating said ridge; and, Figure 4 shows the same structure with the gathering points and the chain operating on level ground instead of on ridged ground, as shown in Figure 3.

The corn harvester embodies a transverse axle 10, which at opposite sides rigidly carries upwardly and rearwardly inclined brackets 11, each said bracket carrying a forwardly and downwardly extending frame angle bar 12, the angle bar 12 on the stubbleward or far side being bent inwardly, as shown in Figure 1. The lower front end of each of these two spaced angle bars 12 is carried on a gauge or runner shoe 13, which rides the ground closely adjacent the stalk rows and consequently always, at what might be termed the base line of the stalks where they emerge from the ground. The forward and lower end of each frame bar 12 carries a suitable bearing 14 for respectively carrying an upwardly and rearwardly inclined snapping roll 15, said two rolls 15 being in the usual parallel, spaced apart relation to receive the corn stalks therebetween for snapping the ears therefrom in a manner well known in this art. The rear end of each roll 15 is journaled in a suitable bracket 16 securely connected to one of the bars 12, as shown in Figure 2, each roll 15 at its rear end including a spur gear 17 whereby the same may be oppositely driven in the usual manner. A drive shaft 18, from any suitable source, serves to transmit power to one of the rolls.

The axle 10, at points spaced outwardly of the two frame bars 12, carries respective opposite brackets 19, only one of which is shown, to which is connected by a universal or gimble joint 20 a forwardly extending push pipe or bar 21, both push pipes being shown in the drawing of Figure 1, the same diverging as they extend forwardly, and each pipe at its front end passing through a forwardly and downwardly extending shield structure 22, which shield structure is supported by being secured to respective brackets 23 secured to the forward ends of the push pipes 21. The forward end of each bar 21 is connected to a runner shoe 24, and the shields 22, respectively, are formed into points 25, which ride on the ground floatingly, because of the pivotal connection of the bars 21 to the axle 10. Each bar 21, near its rear end, carries a suitable frame support 26 for carrying the rear portions of said shield structure 22, which at the rear end is cross-connected, as shown at 27 in Figure 3, and provided with an opening 28, through which may pass an ear elevator 29, generally indicated in the dotted lines in Figures 1 and 2, said elevator being shown in dotted lines to expose the mechanism therebelow.

The inner frame bar 12, shown in Figure 2, carries a bracket 30 for journaling an upright shaft 31, which includes a sprocket wheel at its upper end for driving a main forwardly and downwardly inclined gathering chain 32, said shaft 31 including a universal joint 33, the bearing for the sprocket wheel which drives the chain 32 carrying a flat forwardly and downwardly extending triangularly shaped shield or table 34 across which the said upper gathering chain 32 drags, said chain at its front end being trained around an idler sprocket wheel 35 and, at its inner front end adjacent the feed throat, around another idler sprocket wheel 36. The inner frame 12 carries a bracket 37 for supporting a parallel frame bar 38, which frame bar at its front end and at its rear end carries brackets 39 including aligned hinges 40, which in turn serve to carry the table 34 hingedly for movement about the aligned axes of the hinge pins 40. The shaft 31 is driven from a sprocket chain 41, which in turn is driven from gearing located in a gearbox 42 suitably mounted on the frame 16. The gearing within this box 42 is driven by a sprocket chain 43 connected to the shaft 18 in an obvious manner. The lower end of the shaft 30 also serves to carry and drive a lower sprocket chain 44, which is trained around a sprocket wheel and shaft 45 carried by the runner shoe 13, as shown. The lower gatherer chain 44 always runs in the same relationship to the frame member 12 disposed therebelow. However, the upper gatherer chain 32 may float with the table 34, since it is completely carried on the frame push bar 21 at its lower end and a universal joint 33 at the upper end, making such movement possible in relation to the support 30, which is carried on the relatively fixed frame bar 12.

The upper or main gatherer chain 32, at its front end, presents a transverse run of chain between the sprocket wheels 35 and 36, which is of a length substantially equal to the width of one slope of a stalk ridge, so that, when the adjacent point 25 has dropped into the hollow alongside a ridge, the forward edge of the chain 32 will serve to rake the slope of the ridge, as indicated in Figure 3, aggressively and positively to engage any down stalks lying on said slope and also loose ears thereon, to pick up such material and make certain that it will properly pass through the feed throat provided between adjacent gatherer units 22 and the two snapping rolls 15.

So far, only one side, or the inner gathering unit, has been described. The opposite side is quite similar in that it too provides a table 34', which at its front end carries an idler sprocket 35', and at its inner corner, an idler sprocket 36', there being a main or upper forwardly and downwardly inclined gatherer chain 32' operable over said table 34'. The adjacent frame bar 12 carries an upright shaft 31', on the upper end of which is a sprocket wheel, to drive said chain 32', and said shaft 31' derives its power from an auxiliary gatherer chain 46, which in turn is driven by a sprocket wheel 47 from a chain 48 deriving rotation from a gear-box 49 including a shaft 50 that is driven from the gearing within the gearbox 42. The stubbleward gathering unit, which I am now describing, also includes a lower gatherer chain which is numbered 44' and is the counterpart of the intermediate gatherer chain numbered 44 on the other side. The table 34' is carried by a bracket 39' including aligned hinges 40' at its inner edge from a frame piece 38'.

It can be seen that the gatherer chain 32' with its table 34' may also hinge about the aligned axes 40', so that, when the associated gatherer point 25 drops in a hollow alongside a ridge, the forward run of the chain 32' will be effective to rake the ridge slope in the manner described in connection with the opposite unit.

This completes details of the structure, and the mode of operation thereof will next be described.

As the machine is moved along a row of stalks, which we will assume are growing on a ridge, we find that the runner or gauge shoe 13 drags alongside the stalks on the ridge to keep the points of the snapping rolls 15 in the proper position with respect to the standing stalks as the latter pass through the space between the rolls 15. Because the gatherer units 22 are supported from their points 25 and pivotally about the axle 10 through the universal or gimble joint 20, we find that said points 25, since they are laterally spaced from the shoes 13, drop down into the adjacent dwells or hollows delineating the ridge being traversed. Consequently, the laterally spread gatherer chains 32 and 32' drop downwardly at their outer ends with their respective table supports 34 and 34' about their respective hinges 40 and 40', so that, as shown in Figure 3, the forward laterally disposed portions of said gatherer chains 32 and 32' with their tangs will drag across and rake the sides or slopes delineating the ridge whereby any down corn stalks or loose ears will be aggressively engaged and delivered upwardly and rearwardly into the throat to be treated by the rolls 15. Thus, it is an important aspect of the structure, which now will be appreciated, that the points of the gathering rolls 15 always are maintained the same distance above the base line of the stalks, regardless of the fact that the points 25 of the gathering units 22 may be dropped down at the sides of a ridge below the level of the ridge on which the runners 13 operate.

Since the units 22 are floatingly carried on the ground by their pivoted pusher bars or pipes 21, it follows that, when the gathering mechanism is operated over level ground, as shown in Figure 4, the relationship of the forward points of the rolls 15 with respect to the runners 13 still is not interfered with, even though the points 25 of the two gatherer units 22 now operate on the same level therewith. It is obvious that the gimble joints 20 will provide any necessary lateral flexibility for the pusher bars 21 and units 22, should it be required.

The parts are driven in a manner heretofore described and this need not be gone into again.

It is the intention to cover all changes and modifications which do not depart from the spirit and scope of the invention as defined in the appended claims.

What is claimed is:

1. In a corn picker having an upwardly and rearwardly inclined frame having gauge means riding on the ground at its front end, said frame carrying snapping rolls, said rolls having points disposed in a definite position in relation to the base line of the stalks being treated, the combination with said rolls of a gatherer unit disposed respectively on each side of the rolls and each unit including a point for riding the units on the ground floatingly whereby said unit points may ride at a level below said base line without disturbing the gauged position of the roll points.

2. In a corn picker having an upwardly and rearwardly inclined frame having gauge means riding on the ground at its front end, said frame carrying snapping rolls, said rolls having points disposed in a definite position in relation to the base line of the stalks being treated, the combination with said rolls of a gatherer unit disposed respectively on each side of the rolls and each unit including a point for riding the units on the ground floatingly whereby said unit points may ride at a level below said base line without disturbing the gauged position of the roll points, and a gatherer chain respectively included in said units and movable bodily with the said floating units.

3. In a corn picker having an upwardly and rearwardly inclined frame having gauge means riding on the ground at its front end, said frame carrying snapping rolls, said rolls having points disposed in a definite position in relation to the base line of the stalks being treated, the combination with said rolls of a gatherer unit disposed respectively on each side of the rolls and each unit including a point for riding the ground floatingly and independently of the frame whereby said unit points may ride at a different level from that of the gauge means without disturbing the gauged position of the roll points.

4. In a corn picker having an upwardly and rearwardly inclined frame having gauge means riding on the ground at its front end, said frame carrying snapping rolls, said rolls having points disposed in a definite position in relation to the base line of the stalks being treated, the combination with said rolls of an independently and hingedly mounted gatherer unit disposed respectively on each side of the rolls and each unit including a point riding the ground whereby said unit points may ride at a different level from that of said gauge means without disturbing the gauged position of the roll points.

5. In a corn picker having an upwardly and rearwardly inclined frame having gauge means riding on the ground at its front end, said frame carrying snapping rolls, said rolls having points disposed in a definite position in relation to the base line of the stalks being treated, the combination with said rolls of an independently and hingedly mounted gatherer unit disposed respectively on each side of the rolls and each unit including a point riding the ground whereby said unit points may ride at a different level from that of said gauge means without disturbing the gauged position of the roll points, and a gatherer chain included in each unit to rise or fall therewith and including a forwardly disposed stretch disposed cross-wise of the line of draft to rake the ground at each side of the stalk row.

6. In a corn picker having an upwardly and rearwardly inclined frame having gauge means riding on the ground at its front end, said frame carrying similarly inclined snapping rolls, said rolls having points disposed in a definite position in relation to the base line of the stalks being treated, the combination with said rolls of an independently and hingedly mounted gatherer unit disposed respectively on each side of the rolls and each unit including a point riding the ground whereby said unit points may ride at a different level from that of said gauge means without disturbing the gauged position of the roll points, and a gatherer chain including a support therefor included in each unit, said supports being respectively movable hingedly about an axis substantially parallel to the axes of the rolls.

7. In a corn picker having an upwardly and rearwardly inclined frame having gauge means riding on the ground at its front end and carrying snapping rolls, the combination with said rolls of an independently and hingedly mounted gatherer unit disposed respectively on each side of the rolls and each unit riding floatingly on the ground at its forward end, and a gatherer chain operable on each of said units and movable up or down therewith.

8. In a corn picker having an upwardly and rearwardly inclined frame having gauge means riding on the ground at its front end and carrying snapping rolls, the combination with said rolls of a gatherer unit disposed respectively on each side of the rolls and each unit riding on the ground floatingly independently of said frame without disturbing the gauged position of the roller points.

9. In a corn picker having an upwardly and rearwardly inclined frame having gauge means on the ground at its front end and carrying snapping rolls, the combination with said rolls of a gatherer unit disposed respectively on each side of the rolls and each unit riding the ground floatingly independently of said frame without disturbing the gauged position of the roll points, and an operable gatherer chain mounted on each unit to move therewith and including a forward portion disposed transversely of the line of draft and positioned to rake the ground at the side of a stalk row.

10. In a corn picker having a transverse axle carrying a forwardly and downwardly inclined frame the forward end of which includes gauge means riding on the ground, inclined snapping rolls mounted on said frame having forward ends disposed adjacent said gauge means, the combination with said rolls of a gatherer unit including a gathering chain disposed on each side of the rolls, means hinging the units for floating movement relative to the rolls, and a pusher bar for each unit respectively connected hingedly to the axle and said units at the forward ends of the latter.

11. In a corn picker having a transverse axle carrying a forwardly and downwardly inclined frame the forward end of which includes gauge means riding on the ground, inclined snapping rolls mounted on said frame having forward ends disposed adjacent said gauge means, the combination with said rolls of a gatherer unit including a gathering chain disposed on each side of the rolls, means hinging the units for floating movement relative to the rolls, and a pusher bar for each unit respectively connected hingedly to the axle and said units at the forward ends of the latter, the connection of each bar to the axle comprising a flexible coupling enabling each bar to move up and down and also sidewise.

12. A corn picker comprising an axle, wheels supporting the axle, a frame pivoted on the axle and having a portion spaced from the axle adapted to ride on the ground, snapping rolls mounted on the frame extending from adjacent the portion riding the ground toward the axle, and gathering units pivotally mounted on the frame about axes substantially parallel to the axes of the snapping rolls and having portions offset from their pivoting axes adapted to ride the ground.

13. A corn picker comprising an axle, a frame extending from said axle and having a ground-contacting portion, snapping rolls extending from points adjacent said ground-contacting portion toward said axle, and gathering units mounted on the frame adjacent the snapping rolls so as to swing about axes substantially parallel to the axes of the snapping rolls.

14. A corn picker comprising an axle, a frame pivoted on said axle, a pair of snapping rolls mounted ono the frame and extending at substantially right angles to the axle, and a pair of gathering units pivotally mounted on said frames to swing about axes at a substantial angle to the axle and having portions of gathering chains extending generall yat right angles to the snapping rolls.

15. A corn picker comprising an axle, a frame pivoted on the axle, snapping rolls mounted on the frame, a pair of gathering units pivotally mounted on the frame to swing about axes at substantial angles to the axle and having ground-contacting portions offset from the pivot axes, and push bars connected to the axle and the gathering units at points adjacent the ground-contacting portions.

16. A corn picker comprising an axle, a frame pivoted on the axle and having a ground-contacting portion spaced from the axle, snapping rolls on the frame extending at substantially right angles to the axle, gathering units pivotally mounted on the frame to swing about axes substantially parallel to the snapping rolls, and push rods attached at one end to the axle and adjacent the opposite end to the gathering units at points offset from their pivot axes, said opposite ends serving as ground-contacting portions.

RECTOR C. FERGASON.